No. 711,851. Patented Oct. 21, 1902.
B. M. W. HANSON.
FEED MECHANISM FOR METAL WORKING MACHINES.
(Application filed Feb. 20, 1902.)
(No Model.) 6 Sheets—Sheet I.
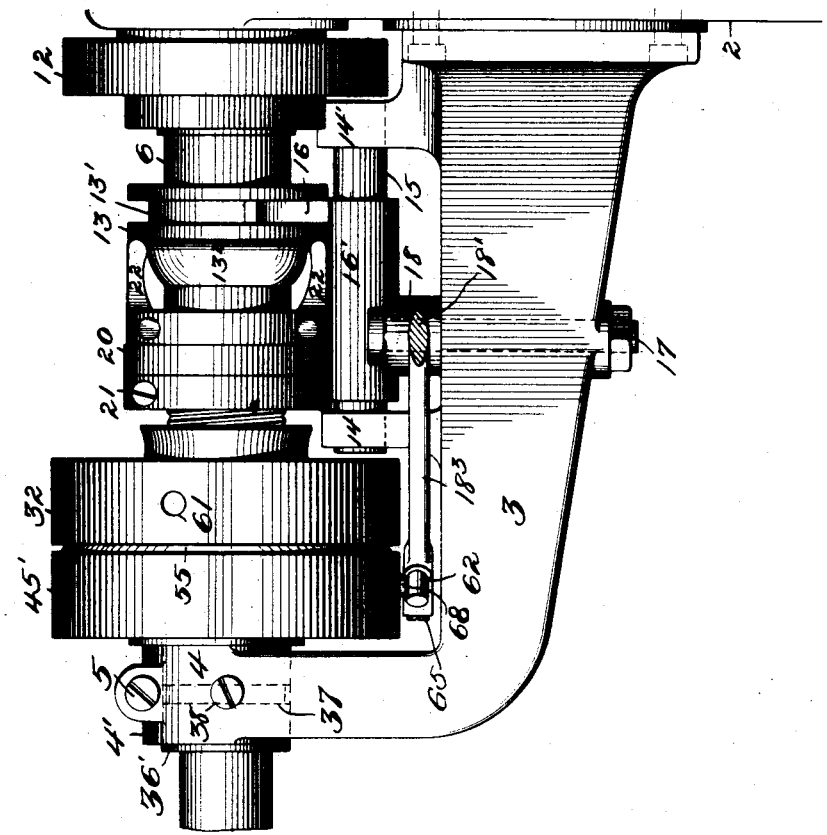
Fig. I.
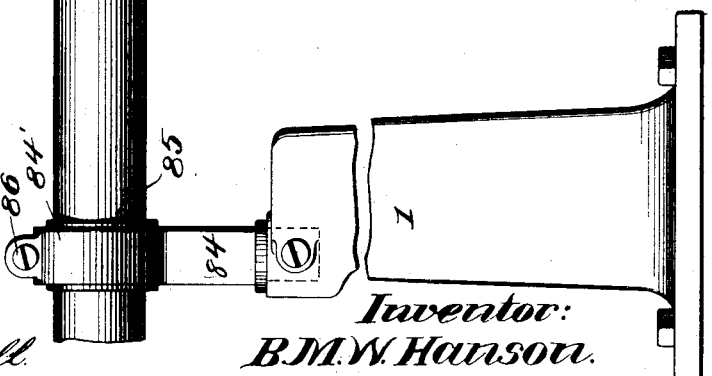
Witnesses:
Frank G. Campbell
W. H. Blodgett Jr.
Inventor:
B. M. W. Hanson.
By his Attorneys No. 711,851. Patented Oct. 21, 1902.
B. M. W. HANSON.
FEED MECHANISM FOR METAL WORKING MACHINES.
(Application filed Feb. 20, 1902.)
(No Model.) 6 Sheets—Sheet 2.
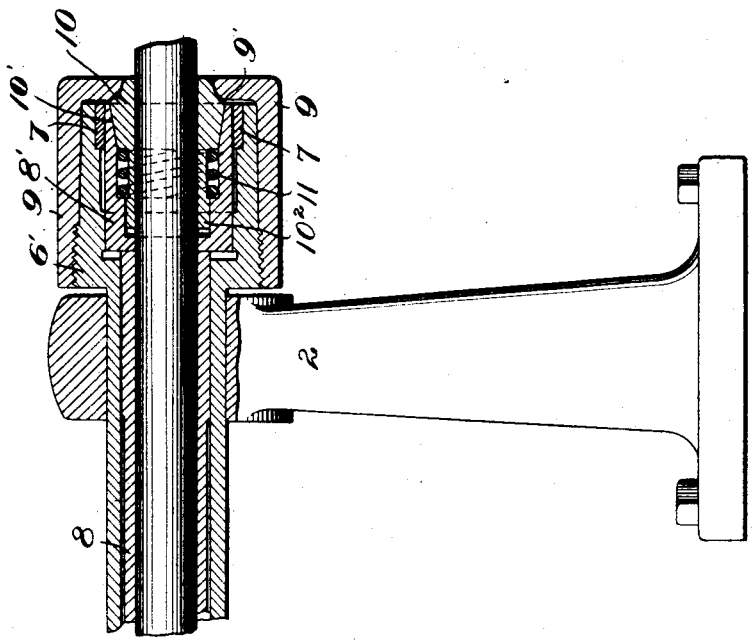
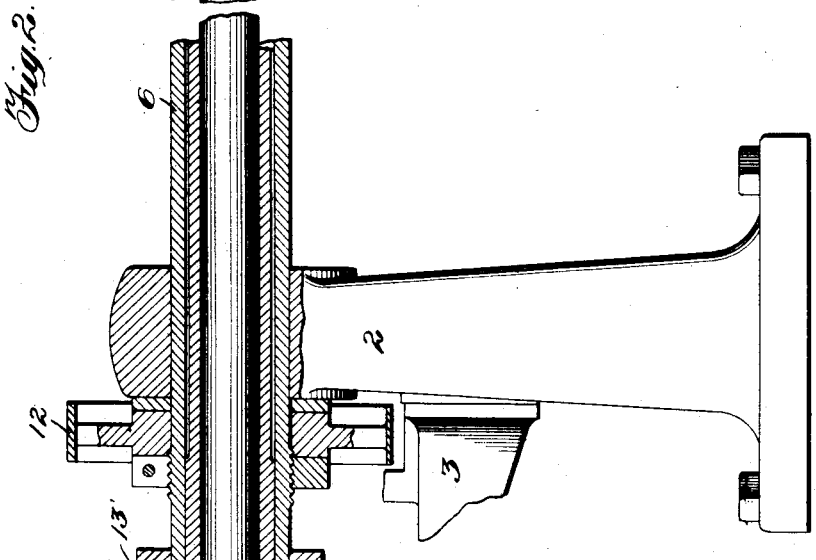
Witnesses:
F. G. Campbell.
W. H. Blodgett Jr.
Inventor:
B. M. W. Hanson.
By his Attorneys
Blodgett & Peck

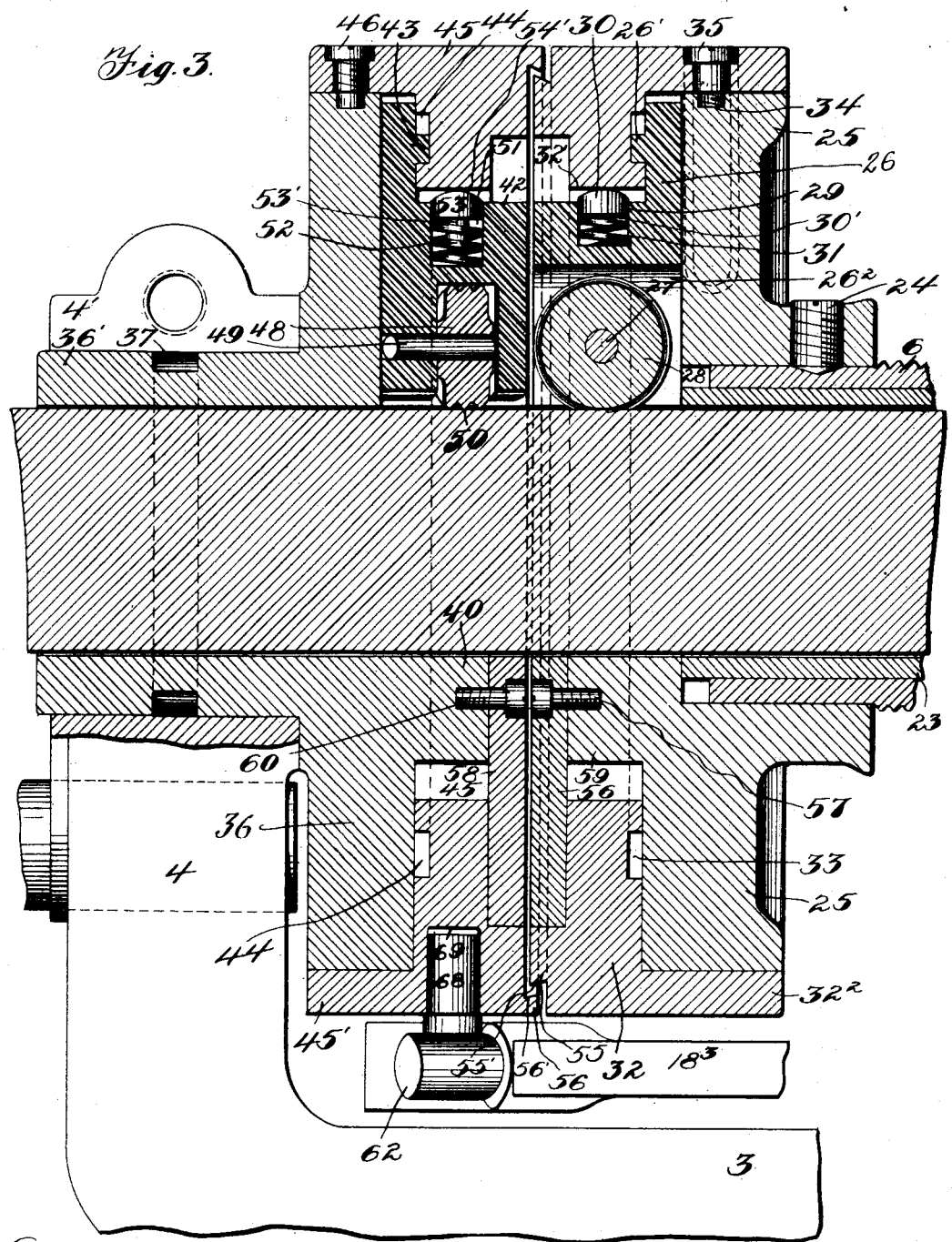

No. 711,851. Patented Oct. 21, 1902.
B. M. W. HANSON.
FEED MECHANISM FOR METAL WORKING MACHINES.
(Application filed Feb. 20, 1902.)
(No Model.) 6 Sheets—Sheet 4.
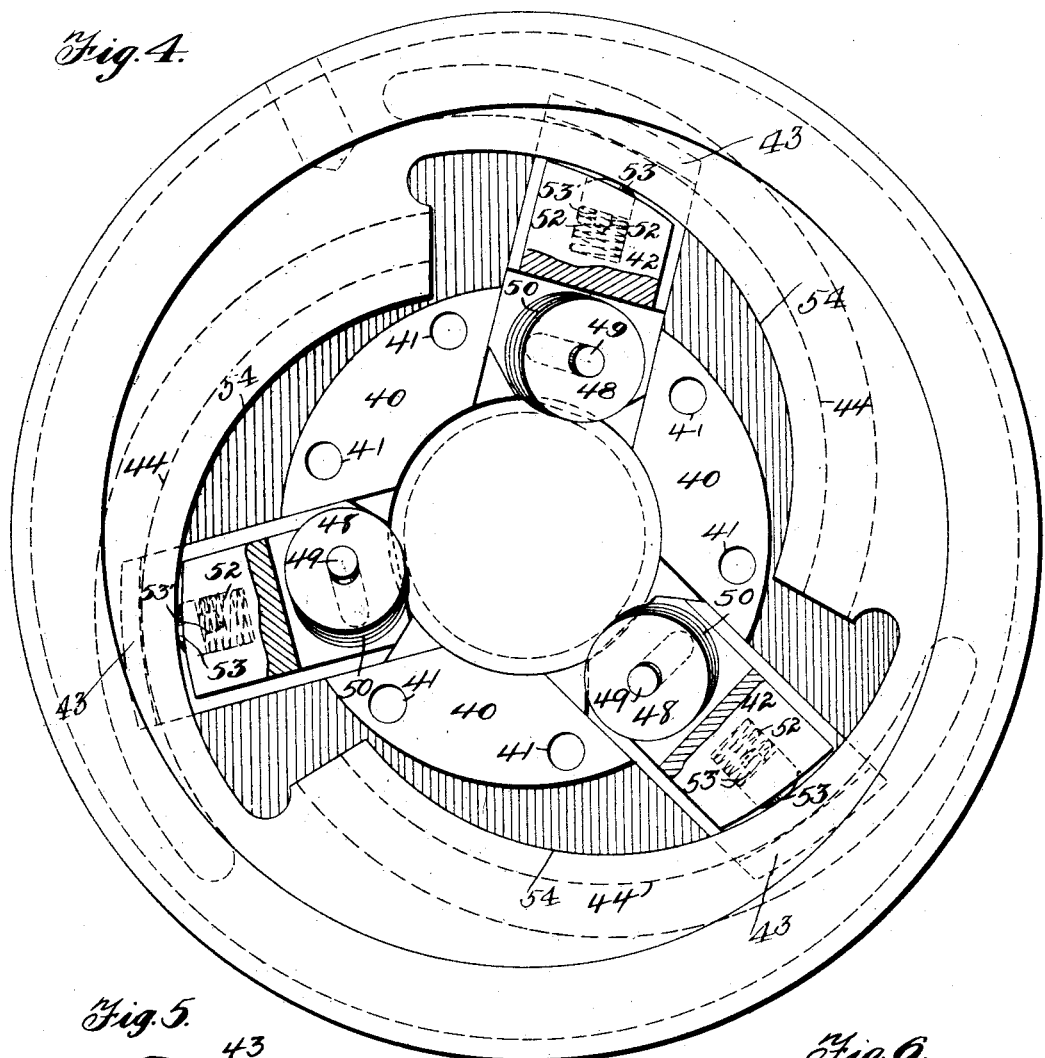
Fig. 4.
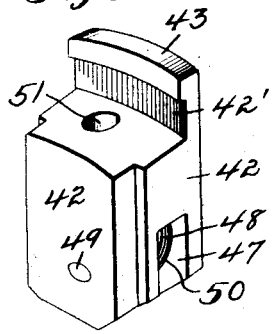
Fig. 5.
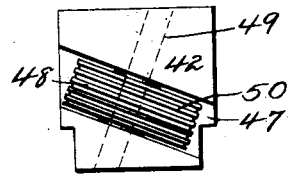
Fig. 6.
Fig. 11.
Witnesses:
F. G. Campbell.
W. H. Blodgett Jr.
Inventor:
B. M. W. Hanson.
By his Attorneys
Blodgett & Peck
THE NORRIS PETERS CO., PHOTO-LITHO., WASHINGTON, D. C.

No. 711,851. Patented Oct. 21, 1902.
B. M. W. HANSON.
FEED MECHANISM FOR METAL WORKING MACHINES.
(Application filed Feb. 20, 1902.)
(No Model.) 6 Sheets—Sheet 5.

Witnesses:
F. G. Campbell
Frances E. Blodgett

Inventor:
B. M. W. Hanson,
By his Attorneys,
Blodgett & Peck

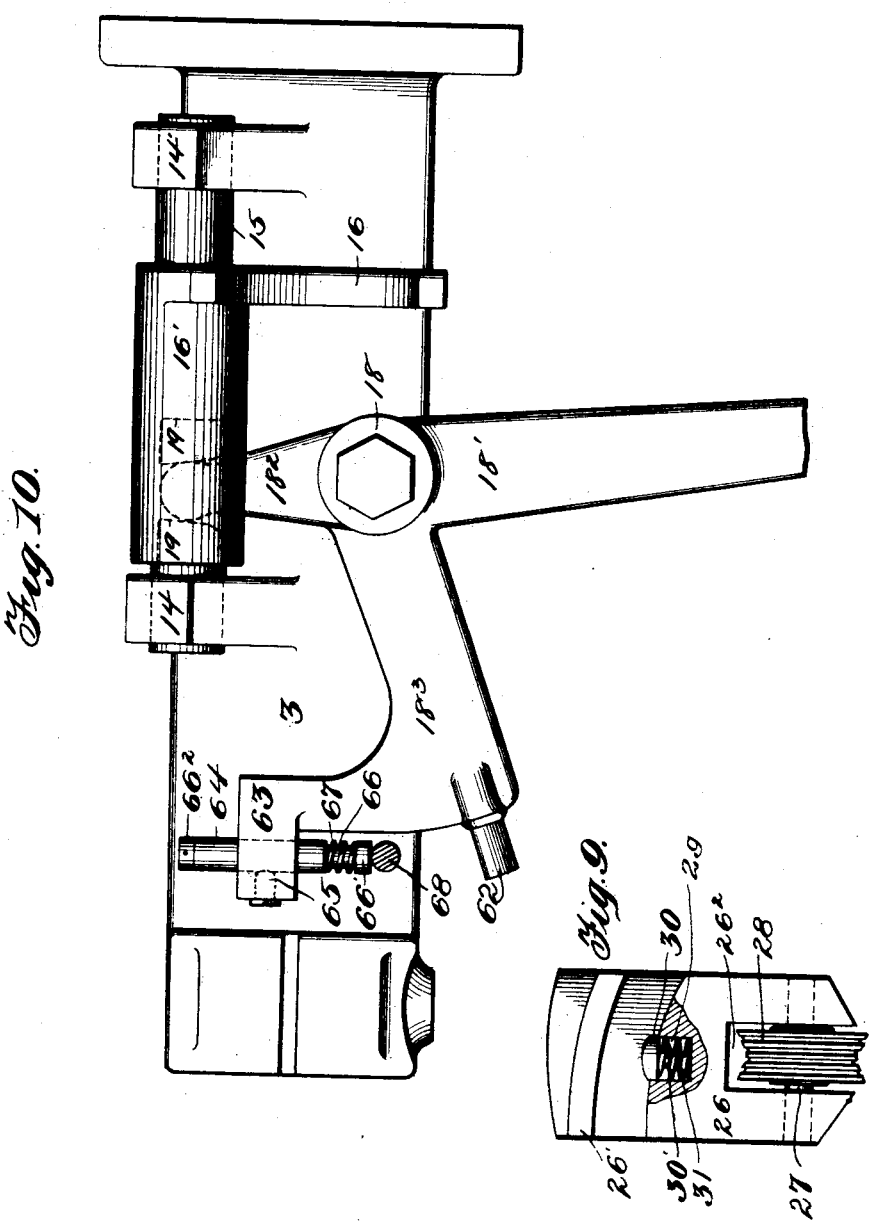

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

FEED MECHANISM FOR METAL-WORKING MACHINES.

SPECIFICATION forming part of Letters Patent No. 711,851, dated October 21, 1902.

Application filed February 20, 1902. Serial No. 94,912. (No model.)

*To all whom it may concern:*

Be it known that I, BENGT M. W. HANSON, a subject of the King of Sweden and Norway, residing at Hartford, in the county of Hartford and State of Connecticut, have invented certain new and useful Improvements in Feed Mechanisms for Metal-Working Machines, of which the following is a specification.

My invention relates to means for feeding stock to the chucks of metal-working machines, such as screw and analogous machines of various kinds.

Primarily the object of the invention is the provision of improved feed mechanism for advancing stock of any desired size or proportions to or through the chuck of the machine.

A further object of the invention is the provision of an improved chuck having rollers of peculiar construction for engaging with and rotating the stock.

A further object of the invention is the provision of feed-rollers of novel construction for engaging directly with and advancing the stock to the chuck.

Further objects of the invention relate to improvements in the chucks for carrying the stock rotating and feeding rollers, as will be hereinafter described.

Figure 7:
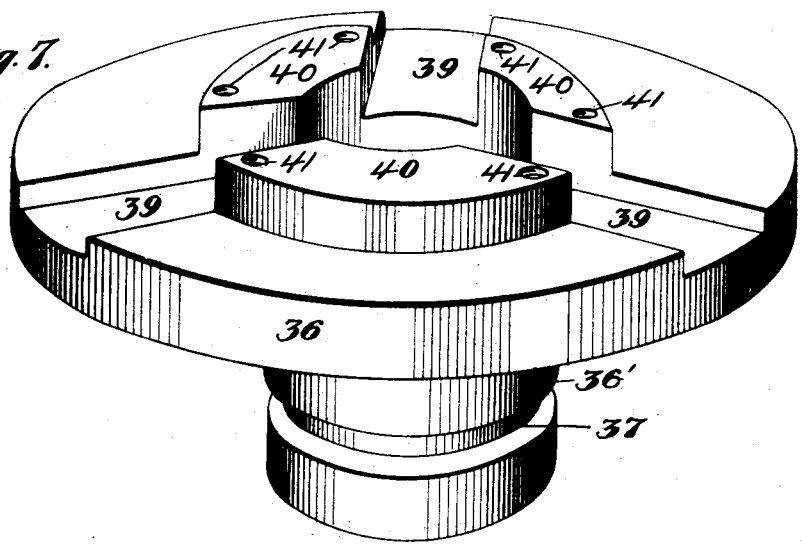
Figure 8:
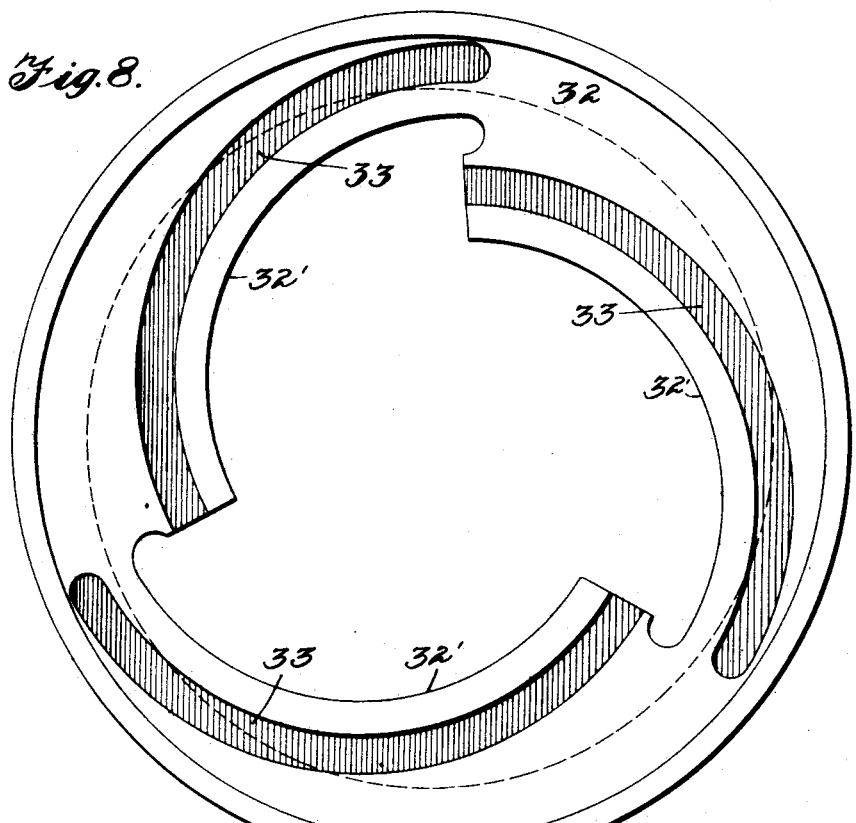

In the accompanying drawings, Figure 1 is a side elevation of part of my improved feed mechanism. Fig. 2 is a longitudinal vertical section of another part of said feed mechanism. Fig. 3 is a longitudinal vertical section of the means employed for rotating the stock and for advancing said stock to the chuck. Fig. 4 is an elevation, partially in section, of the roller feed mechanism and the head in which it is mounted. Fig. 5 is a perspective view of one of the blocks in which the feed-rollers are mounted. Fig. 6 is a bottom plan view of one of the feed-roller blocks, showing the construction and position of the feed-roller. Fig. 7 is a perspective view of the feed-roller chuck-head. Fig. 8 is a view in elevation of the inner face of the cam-ring employed for actuating the blocks carrying the rollers for rotating the stock. Fig. 9 is a side elevation, partially in section, of one of the blocks carrying the rollers for rotating the stock. Fig. 10 is a plan view of part of the bracket for supporting the feed mechanism and of the lever mechanism thereon, the handle of the lever being broken away. Fig. 11 is a bottom plan view similar to Fig. 6, showing a modified form of feed-roller.

Like numerals designate similar parts throughout the several views.

Referring to the drawings, the numerals 1 and 2 denote supporting standards or framework of my improved feeding mechanism, and the numeral 3 indicates a bracket projecting from one of the standards and having a vertical extension 4, terminating in a split bearing 4', the split parts of said bearing being united by a binding-screw 5.

Within bearings of the standards 2 is mounted a hollow rotary spindle 6, having a chuck-head 6', provided with a circular wear plate or ring 7, inserted in a rabbeted portion of its open end. Within this spindle 6 is a hollow spindle 8, through which the stock is fed, said spindle having an outwardly-flaring head 8'. Surrounding the head 6' is a sleeve or shell 9, having an open end 9' for the reception of the extremity of a split chuck 10, having an inclined surface 10' and a hollow stem $10^2$, and encircling said hollow stem $10^2$ and located between shoulders of the chuck 10 and 8' is a spring 11, the tendency of which is to force the spindle 8 backward, and thereby permit the chuck to expand and release the stock.

Secured to spindle 6 is a pulley or, it may be, equivalent element 12, to which power is applied for rotating said spindle, and loosely fitted upon the spindle is a sleeve 13, having a circular groove 13' and a conical end $13^2$.

Projecting vertically from bracket 3 are short standards 14 14', carrying a guide-rod 15, and sleeved upon this rod between said standards is the hub 16' of a fork 16, the latter fitting into the groove 13' of the shiftable sleeve 13.

Pivoted to the bracket 3 upon a bolt 17 is a lever 18, having a handle 18', an extension $18^2$, and an angular portion $18^3$, said extension $18^2$ being inserted between a pair of lugs 19, located on the inner side of the sleeve 16', reciprocatory on guide-rod 15.

Threaded upon the spindle 6 is a collar 20, locked against rotation by a split ring or nut 21, and pivoted to this collar 20 are levers 22, having tails 22' resting upon the conical portion 13² of sleeve 13, and angular projections 22², abutting against a flange 8² of chuck-spindle 8, said projections passing through slots 6² in the spindle 6, as shown in Fig. 2.

From the above description it follows that when the sleeve 13 is reciprocated to tilt the levers 22 upon their pivots the projections 22² of said levers will force the tube 8 longitudinally in the spindle 6, thereby causing the head 8' to contract the split chuck 10 to make it grasp the work, and that when said conical portion is withdrawn from beneath the levers the spring 11 will force back said tube 8, and thereby permit the chuck to expand and release the work.

While a conventional stock-chucking device is shown, it is distinctly to be understood that my invention is not limited thereto, for any suitable chuck mechanism may be employed as a substitute therefor, if desired.

Designated by the numeral 23 and located in the slotted rear end of spindle 6 is a bushing, and secured to said spindle by a screw 24 is the hub of a chuck 25, which will be hereinafter described and which, by the connection described or any other suitable substitute therefor, is caused to rotate with said spindle 6. By providing this bushing the slotted spindle is prevented being crushed or distorted by the chuck 25 or by the pressure of screw 24. Mounted in guideways of the chuck-body are blocks 26, having cam-ribs 26', and located in slots 26² of said blocks upon rods or spindles 27, upon which they may move laterally, are ribbed or corrugated rollers 28, said rollers being grooved and being so arranged that their grooves are in line with the feed-path of the stock. Any desired number of said blocks and rollers may be employed, the invention not being limited in this respect; but I have found three to be sufficient for all practical purposes, and a chuck for receiving this number is shown in the drawings. By concaving the rollers 28 and providing them with ribs or corrugations, as shown, each roller readily conforms to the periphery of the stock and has a good grasping-surface thereon, and by so mounting the rollers that they have lateral play they will readily conform to any inequalities in the surface of said stock without affecting their holding or grasping functions. The rollers 28 may be mounted in other ways to permit of this movement, if desired, the invention not being limited to the specific manner shown and described.

Each of the blocks 26 is provided with a chamber 29, containing a plunger 30, having a stem 30', surrounded by a spring 31, which may be of any desired kind suitable for the purpose. These plungers have rounded tops bearing against cam-surfaces 32' of the face-plate 32 of the chuck, said face-plate having cam-grooves 33 for the reception of the studs or lugs 26' of blocks 26, and also having an extension 32², overlapping the periphery of the chuck-body 25, as shown in Fig. 3. This extension is slotted at 34, (see dotted lines, Fig. 3,) and the face-plate is secured to said chuck-body by a screw 35, the head of which is fitted in a rabbet of the slot, said screw having a barrel fitting said slot and an end threaded into the chuck-body, as shown in said Fig. 3. As shown by Fig. 4, the width of the cam lug or rib 26' of each block 26 is less than that of the cam-groove 33 in which it works, and by sustaining said blocks in the manner described they are permitted a slight yielding movement to enable the rollers 28 to conform to inequalities of stock upon which they operate and which they cause to rotate.

Any suitable means for yieldingly supporting the blocks 26 in the ways of the chuck-head 25 may be employed as a substitute for those shown without departure from the invention.

Designated by the numeral 36 is a feed-roller chuck-head having a hub 36', mounted in bearing 4' of extension 4 of the bracket 3, said hub having a circumferential groove 37 for the reception of the plain end of a screw 38, carried by the bearing, as shown in Fig. 1. This chuck-head 36 is provided with a series of radial guide grooves or ways 39 and with projections 40 of segmental form, in which are formed openings 41, having threaded walls, as illustrated in Fig. 7. Fitted in the guideways 39 of the chuck-head 36 are sliding blocks 42, one of which is shown detached in Fig. 5 and each of which has an extension 42', provided with a cam rib or projection 43 of less width than and adapted to fit in the cam-grooves 44, formed in the inner side of a face-plate 45, having a circular lip or extension 45', overlapping the chuck head or body 36, as shown in Fig. 3, and secured thereto by a screw 46, threaded into said lip and having a tip fitting in a slot of the head 36 and a flanged head seated in a rabbet of the seat with which it is in threaded engagement. To prevent binding of the cam-ribs 43 of blocks 42 in the cam-grooves 44 of face-plate 45 and of the cam-ribs 26' of blocks 26 in cam-grooves 33 of face-plate 32, said ribs and grooves are formed on arcs of different radius, as shown by dotted lines in Fig. 4.

Each block 42 is slotted diagonally in its end opposite cam-rib 43 at 47 to receive either a ribbed feed-roller 48 or a plain feed-roller 48', Fig. 11, carried by a pin 49, journaled in the block, and each of these feed-rollers is provided with a series of parallel threads or ribs 50, which engage the periphery of the stock.

In each of the blocks 42 is a socket 51 for the reception of a spring 52, surrounding the stem 53' of a pin or plunger 53, the rounded head of which bears against a cam-surface 54 of the same arc of curvature as the cam-groove 44. As will be observed, the blocks 42 are yieldingly supported in the same manner as the blocks 26 of chuck 25 and for the same purpose—viz., to enable the feed-rollers to accommodate themselves to unevenness occurring in the periphery of the work upon which they act.

As shown in Fig. 3, the face-plate 32 is provided with a circular lip or projection 55, having an undercut or inclined periphery 55', this lip or projection being of less diameter than the body of said face-plate and being inserted within an overhanging circular lip 56 on face-plate 45 of chuck-head 36, said lip 56 being inwardly inclined at 56' and the joint construction subserving the purpose of preventing lubricant from being thrown off by centrifugal force by the rotary face-plate 32.

For retaining the blocks 26 in the guideways of chuck-head 25 plates 56, secured to the projections 59 of said head by bolts 57, are employed, and for accomplishing a like purpose with reference to the feed-roller-carrying blocks 42 similar plates 58 are secured to the segmental projections 40 of chuck-head 36 by bolts 60, as shown in Fig. 3.

For turning the face-plate or cam-ring 32 it may be provided with a socket 61, in which any convenient tool may be inserted when it is desired to rotate said ring and force the rollers 28 against the work. Other ways may be adopted for accomplishing such result, the invention not being limited in this respect. It is important, however, that the chuck 10 should be open when the feed-rollers 48 are forced against the work and that said chuck should be closed when the desired feed movement, the length of which may be controlled by an adjustable stop (not shown) in the usual manner, is effected, and while any desired means suitable for accomplishing the purpose may be adopted without departure from the invention, I have found it convenient to utilize the lever 18. This lever is, as above stated, provided with an extension $18^2$, the end of which is located between the lugs 19 of sleeve 16', carrying the yoke 16, said yoke being inserted in the groove 13' of the cone-sleeve 13 and the latter, through the pivoted levers 22 and hollow spindle 8, with its flaring head 8', actuating the chuck to cause it to assume the closed position represented in Fig. 2 when moved in one direction and releasing said parts when reciprocated in the opposite direction.

Projecting from the arm $18^3$ of the lever 18 is a pin or stud 62, and carried in an angular perforated projection 63 is a tube 64, secured in place by a screw 65 or otherwise. Seated in said tube 64 is a yieldingly-mounted plunger 66, having heads 66' and $66^2$, and surrounding the stem of said plunger between the end of tube 64 and the head 66' is a spiral spring 67.

Projecting from the cam-ring 45 is a pin or stud 68, preferably fitted in a socket 69 of said ring, as shown in Fig. 3, and when the handle 18' of lever 18 is moved to the right, or to the position represented in Figs. 1 and 10, the chuck 10 is closed upon the stock and the cam-ring 45 has been moved by the plunger 66 to withdraw the feed-rollers from engagement with said stock. To insure a quick-closing movement of the chuck 10 upon the stock, the lever 18 is swung rapidly or with a jerk toward the right, and to enable this jerk to take place and also to shift the cam-ring 45 gradually to withdraw the feed-roller blocks 42 the spring-controlled plunger 66 acts as a buffer when it strikes, under the sudden impulse given said lever, the stud or pin 68, projecting from the cam-ring. To open the chuck 10 and turn the cam-ring 45 to force the feed-rollers 48 against the stock, the lever 18 is shifted in the opposite direction, or toward the left, thereby throwing the cone-sleeve 13 along the spindle 6 and withdrawing it from beneath the tails of the levers 22, and thus enabling the spring 11 to force back the spindle 8 and permit the chuck to expand and assume its open position. During this action force must be applied to the lever 18 gradually to cause the pin 62 slowly to force over stud 68 and the cam-ring 45 to close the feed-rollers upon the stock. As has been before stated, these feed-rollers are provided with circumferential ribs 50, which may be of any desired number suitable for the purpose, and as they are set at an angle to throw their working surfaces diagonally across the stock it is desired to have them advance said ribs will act as screw-threads when said stock is rotated by the rollers 28 and will cause the desired feed movement to be imparted.

In Fig. 11 a feed-roller 48', having a smooth periphery, is shown, and this roller works well in practice and is within the field of my invention. A ribbed, threaded, or otherwise roughened roller is, however, preferred, for it gives a better holding-surface with no liability of a failure to feed on account of slippage upon the stock.

In the operation of my improved machine a stock rod, bar, or wire is first inserted through the bushing 85, the spindle 6, chuck-spindle 8, and chuck 10 (which is then open) until its end comes into contact with a stop (not shown) commonly employed with machines of the class to which my invention is applied. The handle of lever 18 is then grasped and moved to the right to actuate the conical sleeve 13 and through the connections described close the chuck 10 upon the stock, and the cam-ring 32 is then shifted to actuate the sliding blocks 26 and cause the rollers 28 to engage the stock. By now applying power to the pulley or other element 12 of spindle 6 said spindle, the chuck 10 controlled thereby, and the chuck 25 are rotated until the required operations by the tools of the machine with which my improved mechanism is employed have taken place, and after the article has been formed on and severed from the end of the stock bar or rod a feed movement is necessary to enable another article to be made. When this feed movement takes place, the chuck 10 must of course be open and the rollers 28 in contact with the stock. Lever 18 is then turned toward the left in the arrangement of the mechanism shown, thereby withdrawing the cone-sleeve 13 from contact with levers 22 and permitting the spring 11 to force back the spindle 8 and the chuck to expand to its open position. For guiding the stock bar, rod, or wire a standard 84 is detachably secured to the column 1, and this standard is provided with a split eye 84' for the reception of a bushing 85, a binding-screw 86 being employed to force the eye to grasp said bushing, as shown in Fig. 1. A further gradual movement of said lever 18 to the left causes the pin or stud 62 to engage the stud 68 of cam-ring 45 to shift said ring and cause the cam-grooves 44 thereof to actuate the blocks 42 and force the feed-rollers into contact with the stock, and from this action it follows that inasmuch as the chuck 36 is stationary and the chuck 25, carrying the grooved and ribbed rollers 28, rotates with the spindle 6 the stock will also be rotated against the diagonally-arranged rollers 48 or 48' and that said rollers will impart a forward feed movement of the desired duration to said stock. After the stock has been advanced to the desired extent the lever 18 is given a quick movement to the right, the chuck 10 is closed by the mechanism controlled by said lever, and the spring-actuated plunger 64 by engaging the stud 68 shifts the cam-ring 45 to withdraw the blocks 42 and the feed-rollers 48.

Changes in the location and arrangement of the various parts of the mechanism described may be made without departure from the invention, which is not limited in this respect, and while manually-operated chuck and feed mechanisms are set forth it is distinctly to be understood that the invention is not restricted thereto, for by suitable mechanical changes all of said mechanisms may be operated automatically, if desired. Changes in the form and construction of the feed-rollers, the stock-rotating rollers, and the details of the various chucks may also be made without departure from the invention, which is not limited to the specific details described.

Having thus described my invention, what I claim is—

1. The combination, with an obliquely-disposed feed device, of a stock-chuck, one of said devices being revoluble with relation to the other, whereby a feed movement may be imparted to the stock; and means for advancing and withdrawing said feed device.

2. The combination, with a stock-chuck, of means for rotating said chuck; a feed-roller against which the stock is rotated, said roller being set obliquely to the line of feed; and a support for said feed-roller.

3. The combination, with a stock-chuck, of means for rotating said chuck; a ribbed feed-roller set obliquely to the line of feed, and against which the stock is rotated; and a stationary support for said feed-roller.

4. The combination, with means for rotating stock, of a series of feed-rollers the peripheries of which are set obliquely to the line of feed; and a stationary support for said feed-rollers.

5. The combination, with a rotatable stock-chuck, of feed-rollers having ribbed peripheries located obliquely to the line of feed; a support for said feed-rollers; and means for forcing the feed-rollers against the stock.

6. The combination, with a revoluble stock-chuck, of feed-rollers, the peripheries of which are set obliquely to the line of feed; and a stationary chuck in which said feed-rollers are mounted.

7. The combination, with a stationary support, of a revoluble feed-roller carried by said support and set obliquely to the line of feed; and stock-rotating devices located adjacent to said stationary support.

8. The combination, with a revoluble chuck, of rollers carried by said chuck; means for forcing said rollers against the work; a stationary chuck; rollers set obliquely to the line of feed; and means for forcing said rollers against the work.

9. The combination, with a chuck, of means for rotating said chuck; rollers having grooved peripheries movably mounted in said chuck; a stationary chuck; and obliquely-disposed feed-rollers movably mounted in said stationary chuck.

10. The combination, with a revoluble chuck, of rollers having grooved and ribbed peripheries for engaging the work; a stationary chuck; ribbed rollers obliquely disposed to the axis of said chuck; and adjustable supports for said ribbed rollers.

11. The combination, with a revoluble chuck carrying grooved rollers, of a stationary chuck; and feed-rollers obliquely disposed to the line of feed supported by said chuck.

12. The combination, with a revoluble chuck, of rollers carried by said chuck; means for actuating said rollers toward and from the axis of the chuck; a second chuck; obliquely disposed feed-rollers carried by said second chuck; and means for adjusting said feed-rollers.

13. The combination, with means for rotating stock, of yieldingly-supported feed-rollers located obliquely to the line of feed and having peripheries constructed to engage and advance the object rotated against them.

14. The combination, with a stationary support, of yieldingly-mounted feed-rollers carried by said support, said feed-rollers being set obliquely to the line of feed, and having ribbed peripheries adapted to engage an object; and means for rotating said object.

15. The combination, with a stationary support, of blocks movably mounted on said support; feed-rollers carried by the blocks, and set obliquely to the axis of the support; means for adjusting said blocks; and means for rotating the object to be fed against said feed-rollers.

16. The combination, with means for rotating stock, of a stationary support, blocks movably mounted on said support; feed-rollers journaled in the blocks and located obliquely to the axis of the support; means for actuating the blocks; and yielding devices between the block-actuating means and the blocks.

17. The combination, with a stationary support, of blocks movably mounted on said support and having recesses; spring-controlled plungers located in said recesses; means for actuating the blocks; obliquely-disposed feed-rollers journaled in the blocks, and having ribbed peripheries; and means for rotating stock against said rollers.

18. The combination, with a stationary support, of sliding blocks mounted on said support; cam mechanism for adjusting said blocks; feed-rollers carried by the blocks, and located obliquely to the axis of the support; and means for rotating stock, against said rollers.

19. The combination, with means for rotating work, of a stationary support; recessed blocks mounted in ways of said support; spring-controlled plungers seated in the recesses of the blocks; obliquely-disposed feed-rollers journaled in the blocks; and a cam-ring for adjusting the blocks.

20. The combination, with means for rotating work, of a stationary support; recessed blocks mounted in ways of said support; spring-controlled plungers seated in the recesses of the blocks; feed-rollers journaled in the blocks and having peripheries located obliquely to the axis of said support; a cam-ring for adjusting the blocks; and means for actuating the cam-ring.

21. The combination, with a stationary support having guideways, of blocks seated in said guideways, each of said blocks having recesses; spring-controlled plungers located in certain of the recesses of said blocks; feed-rollers journaled in the other recesses of said blocks; and cam mechanism, a part of which bears against the spring-controlled plungers for reciprocating said blocks.

22. The combination, with a revoluble support, of rollers carried by said support, said rollers having grooved and ribbed peripheries; a stationary support; obliquely-disposed feed mechanism carried by said support; and means for permitting a yielding movement of said mechanism.

23. The combination, with a revoluble support, of rollers journaled in said support; means for yieldingly sustaining said rollers against the object it is desired to rotate; a stationary support; an obliquely-disposed feed device carried by said stationary support; and means for advancing and withdrawing said feed device.

24. The combination, with a revoluble support having ways, of blocks movable in said ways; grooved and ribbed rollers journaled in the blocks; means for yieldingly supporting said blocks; and means for actuating the blocks.

25. The combination, with a revoluble support having ways, of recessed blocks mounted in said ways; a grooved and ribbed roller journaled in each block; spring-controlled plungers mounted in the recesses of the blocks; and means for actuating said blocks.

26. The combination, with a revoluble support, of blocks movably mounted on said support; rollers journaled in the blocks and having grooved and ribbed peripheries; spring-controlled plungers carried by the blocks; and a movable device having a cam-surface in engagement with said plungers.

27. The combination, with a support, of blocks movably mounted on said support and having projections; a movable device having cam-grooves of greater width than said projections, whereby longitudinal play of said blocks is permitted; and means carried by the blocks for engaging work.

28. The combination, with a support, of blocks reciprocatory on said support and having cam-ribs; a movable device having cam-grooves of greater width than said cam-ribs and differing in curvature therefrom; yielding plungers carried by the blocks; and devices for engaging work also carried by said blocks.

29. The combination, with a stationary support, of blocks movable in ways of said support, and having cam-surfaces, a movable device having cams of a width and curvature different from that of said cam-surfaces; and feed-rollers journaled on said blocks.

30. The combination, with a stationary support having guideways, of blocks movable in said guideways; cam-ribs on the blocks; rollers journaled on the blocks; and a face-plate having cam-grooves differing in width and curvature from said cam-ribs.

31. The combination, with a support having guideways, of blocks mounted in said guideways, said blocks having cam-ribs of a certain curvature; a face-plate movably mounted on the support, and having cam-grooves differing in width and curvature from said cam-ribs; and devices carried by said blocks, and adapted to engage an object placed between them.

32. The combination, with a chuck, of means for rotating said chuck; rollers carried by the chuck; means for actuating said rollers toward and from the axis of the chuck; a stationary chuck; obliquely-disposed feed-rollers movably mounted in said stationary chuck; and means for actuating the feed-rollers toward and from the axis of said stationary chuck.

33. The combination, with chucks, of means for rotating one of said chucks; rollers carried by the rotatable chuck; and feed-rollers carried by the other chuck and set obliquely to the axis thereof.

34. The combination, with chucks, of means for rotating one of the chucks; grooved rollers carried by the rotatable chuck, and ribbed feed-rollers carried by the other chuck, said feed-rollers being located obliquely to the axis thereof.

35. The combination, with chucks, of means for rotating one of said chucks; rollers carried by the rotatable chuck; ribbed rollers carried by the other chuck and set obliquely to the axis thereof; a rotary chuck for clamping the work; and means for actuating said work-clamping chuck.

36. The combination, with a rotary chuck, of grooved rollers carried by said chuck; a stationary chuck; feed-rollers carried by said stationary chuck, said feed-rollers being set obliquely to the axis of the chuck; a rotary work-clamping chuck; and means for actuating said work-clamping chuck.

37. The combination, with a rotary work-clamping chuck, of a hollow spindle communicating with said chuck; a rotary chuck; rollers carried by said chuck and adapted to engage an object placed between them; means for advancing and withdrawing the rollers; a stationary chuck; and obliquely-disposed feed-rollers carried by said stationary chuck.

38. The combination, with a rotary work-clamping chuck, of a hollow spindle communicating with said chuck; a rotary chuck; grooved rollers carried by said rotary chuck; a stationary chuck; and ribbed feed-rollers carried by, and set obliquely to the axis of, said stationary chuck.

39. The combination, with a work-clamping chuck, and with means for rotating the same, of a hollow spindle through which the work passes, said spindle communicating with the chuck; a rotary chuck; grooved and ribbed feed-rollers mounted in said rotary chuck; a stationary chuck; and ribbed feed-rollers set obliquely to the axis of said stationary chuck.

40. The combination, with a stock-rotating device, of a stationary support; feed-rollers movably mounted in said support and set obliquely to the line of feed; and means for actuating said feed-rollers toward and from the axis of the support.

41. The combination, with a chuck having guideways, of blocks mounted in said guideways; rollers journaled in said blocks to have lateral play; and means for adjusting the blocks.

42. The combination, with a chuck having guideways, of recessed blocks mounted in said guideways; spring-actuated plungers fitted in the recesses of the blocks; a face-plate having cam-surfaces with which said plungers are in engagement; means carried by the face-plate for actuating the blocks; and grooved rollers journaled in the blocks and having free lateral movement to enable them to conform to inequalities in the surface of the article with which they are to be engaged.

43. The combination, with a chuck having guideways, of blocks fitted in said guideways; grooved rollers having projections journaled in said blocks to have lateral movement; and means for adjusting said blocks in the guideways.

44. The combination, with a chuck, of adjustable blocks; grooved and ribbed rollers journaled in said blocks for free lateral movement; and means for adjusting said blocks.

45. The combination, with a chuck having guideways, of recessed blocks fitted in said guideways and having cam-ribs; spring-actuated plungers located in the recesses of the blocks; a face-plate having cam-surfaces with which said plungers are in engagement, and also having cam-grooves; and rollers carried by the blocks and having play upon their supports.

46. The combination, with a tubular spindle, of a stock-chuck located at one end thereof; a chuck secured to the other end of said spindle; devices carried by said chuck for engaging an object placed between them; a stationary chuck; obliquely-disposed feed mechanism carried by the stationary chuck; stock-chuck-operating mechanism; and means controlled by an element of the stock-chuck-operating mechanism for throwing the feed mechanism into and out of operation.

47. The combination, with a rotary stock-chuck, of a second rotary chuck; obliquely-disposed feed mechanism; and means for throwing said feed mechanism into and out of action.

48. The combination, with a rotary stock-chuck, of a second rotary chuck; a stationary chuck; obliquely-disposed feed mechanism carried by the stationary chuck; means for actuating the stock-chuck; and devices controlled by said means for actuating the feed mechanism.

49. The combination, with a chuck having guideways, of blocks mounted in said guideways; a face-plate carried by the chuck and having means for actuating said blocks; a projection on said face-plate; a lever; and a device carried by said lever for engaging the projection and thus actuating the face-plate.

50. The combination, with a stationary chuck having guideways, of blocks movable in said guideways and having cam-surfaces; a face-plate movable on the chuck-body and having cam-surfaces in engagement with said cam-surfaces of the blocks; a projection on the face-plate; feed-rollers carried by the blocks; and a pivoted lever having a projection adapted to engage with said projection of the face-plate.

51. The combination, with a chuck having guideways, of blocks mounted in said guideways; feed devices carried by the blocks; a face-plate having a projection; cam-surfaces on the face-plate for actuating the blocks; and a pivoted lever having an arm adapted to engage with said projection of the face-plate.

52. The combination, with a chuck having guideways, of blocks mounted in said guideways; feed-rollers carried by the blocks and set obliquely to the axis of the chuck; a face-plate; means carried by the face-plate for actuating the blocks; a projection also carried by the face-plate; and a lever having a device adapted to bear against said projection and actuate the face-plate.

53. The combination, with a chuck, of obliquely-disposed feed-rollers movably supported in said chuck; a rotary device having cams for actuating said feed-rollers toward and from the axis of the chuck; and a lever having a projection adapted to engage with and actuate said device.

54. The combination, with a stationary chuck, of obliquely-disposed feed-rollers carried by said chuck; mechanism for opening and closing said feed-rollers; a rotary stock-grasping chuck; a second rotary chuck; means for closing said stock-grasping chuck; and a device for actuating said means and for also actuating the mechanism for opening the feed-rollers.

55. The combination, with a stationary chuck having guideways, of blocks having cam-ribs mounted in said guideways; feed-rollers carried by the blocks; a face-plate having cam-grooves for the reception of said cam-ribs, and also having a projection; a lever having an arm adapted to engage said projection to actuate the face-plate and close the feed-rollers; and means also carried by said lever for engaging said projection to open the feed-rollers.

56. The combination, with a stationary chuck having guideways, of blocks having cam-ribs mounted in said guideways; feed-rollers carried by the blocks; a face-plate having cam-grooves for the reception of said cam-ribs and also having a projection; a lever having an arm adapted to engage said projection to actuate the face-plate and close the feed-rollers on one movement of said lever; and yielding means carried by the lever, and adapted to engage the projection on the other movement of said lever.

57. The combination, with a chuck having guideways, of blocks mounted in said guideways; means carried by the chuck for opening and closing the blocks; feed-rollers carried by the blocks; and a lever having a pair of projections, one of which is yieldingly mounted, for actuating said means for opening and closing the blocks.

58. The combination, with a stationary chuck having guideways, of blocks mounted in said guideways; feed-rollers rotatably mounted in said blocks and set obliquely to the axis of the chuck; a face-plate for actuating the blocks; a projection carried by said face-plate; a movably-mounted lever; and a yieldingly-mounted plunger carried by said lever for engaging the said projection.

59. The combination, with a chuck having guideways, of blocks mounted in said guideways, each block having a cam-rib; rollers journaled in said blocks; a face-plate having cam-surfaces for engagement with the cam-ribs of the blocks, and also having a projection; a pivoted lever having an arm; and a yielding plunger located in said arm and adapted to engage with the projection of the face-plate.

60. The combination, with a chuck, of rollers movably mounted in said chuck; means for actuating said rollers to close them; and means, including a yielding plunger, for opening said rollers.

61. The combination, with a stock-grasping chuck, of means for closing said chuck; a lever for actuating said means; a yielding plunger carried by said lever; a feed device; means for closing said feed device; and means controlled by said yielding plunger for opening the feed device.

62. The combination, with a chuck and with means for closing the same, of a feed device; a lever; and yielding means carried by said lever for actuating said feed device to withdraw the same when the chuck is closed.

63. The combination, with a chuck, and with means for actuating the same, of an obliquely-disposed feed device; and means for rotating the article to be fed against said feed device when the chuck is released.

64. The combination, with a chuck having guideways, of blocks mounted in said guideways; projections carried by the blocks; feed-rollers journaled in the blocks; a face-plate having cam-grooves for the reception of said projections of the blocks; a projection on the face-plate; a device having an arm for engaging said projection to actuate the face-plate and close the feed-rollers; and a yielding plunger also carried by said device and adapted to engage the projection to actuate the face-plate and open the feed-rollers.

65. The combination, with a revoluble spindle, of a chuck carried by said spindle; a tube fitted within the spindle and having means for actuating the chuck; means for actuating said tube to close the chuck; an obliquely-disposed feed device; mechanism controlled by the means for closing the chuck for actuating said feed device; and means for rotating the article to be fed against said feed device when the chuck is open.

66. The combination, with a hollow spindle having a head, of a chuck fitted in said head; a tubular spindle carrying means for actuating said chuck; means for actuating said tubular spindle; a lever for controlling the movement of said means for actuating the tubular spindle; an obliquely-disposed feed device; means controlled by said lever for actuating said feed device; and means for rotating the article to be fed to the chuck.

67. The combination, with a tubular spindle, of a split chuck carried by said spindle; a hollow spindle fitted within said tubular spindle; a head carried by said hollow spindle and adapted to contract said split chuck; means for actuating the hollow spindle; a pivoted lever for operating said means; a chuck carrying feed-rollers; and means controlled by said pivoted lever for advancing and withdrawing the feed-rollers.

68. The combination, with a tubular spindle having a head, of a chuck mounted in said head; a hollow spindle fitted within the tubular spindle; means carried by said hollow spindle for actuating the chuck to close the same; pivoted levers in contact with the rear end of said hollow spindle; a cone-sleeve for actuating said levers; a sliding yoke having a hub for actuating said cone-sleeve; a pivoted lever, an arm of which is in engagement with the hub of the yoke; a feed device; and means controlled by said pivoted lever for advancing and withdrawing said feed device.

69. The combination, with a revoluble chuck for grasping and rotating stock, of means for actuating said chuck; a second revoluble chuck; rollers carried by said chuck and having play on their supports; a stationary chuck; and feed-rollers carried by said stationary chuck, said feed-rollers being set obliquely to the path of the feed movement of the stock.

70. The combination, with a chuck having guideways, of blocks mounted in said guideways and having cam projections of a certain curvature; rollers carried by said blocks; yielding plungers also carried by said blocks; a face-plate having cam-surfaces in engagement with said yielding plungers and also having cam-surfaces of a different curvature from that of the cam-surfaces of the blocks; a projection carried by said face-plate; a lever; and devices carried by said lever for engaging said projection to actuate the face-plate.

71. The combination, with a tubular spindle, of a split chuck carried by said spindle; a hollow spindle fitted within the tubular spindle; a head carried by the hollow spindle and adapted to engage with the chuck to close the same; pivoted levers for actuating the hollow spindle; a cone-sleeve slidingly mounted on the tubular spindle; a yoke in engagement with said cone-sleeve, said yoke having a hub; a guide for said hub; a lever for actuating said hub; a feed device; and means carried by said lever for actuating the feed device.

72. The combination, with a chuck, of a tubular spindle through which stock is fed to said chuck; means for rotating said chuck; a rotary chuck; rollers, having peripheries shaped to engage the stock, carried by said rotary chuck; a stationary chuck; and obliquely-disposed feed-rollers carried by said stationary chuck.

73. The combination, with a stationary chuck having guideways, of blocks mounted in the guideways; rollers journaled in the blocks; a movable face-plate having a projection; cam devices for actuating the blocks; a pivoted lever carrying a rigid arm; and a yielding stop also carried by said arm.

74. The combination, with a stationary chuck-body, of means for securing said chuck-body in position; blocks movably mounted on said chuck-body; means for actuating the blocks; feed-rollers carried by the blocks; a device having a yielding stop; a stock-chuck; and means controlled by the device having a yielding stop for closing said stock-chuck.

75. The combination, with a stock-grasping chuck, of a tubular spindle; means carried by said spindle for actuating said chuck; means for actuating the tubular spindle; a hollow spindle in which said tubular spindle is supported; a chuck secured to said hollow spindle; rollers carried by said chuck and having grooved peripheries; a stationary support; and obliquely-disposed feed mechanism carried by said support.

76. The combination, with a split chuck, of a hollow spindle in which said chuck is mounted; means for closing the split chuck; a chuck secured to said hollow spindle; rollers having grooved and ribbed peripheries carried by said chuck; and obliquely-disposed feed mechanism.

77. The combination, with a hollow spindle, of a chuck carried at one end of said spindle; means for actuating said chuck; a second chuck also carried by the hollow spindle; rollers having grooved peripheries carried by said second chuck; a stationary chuck; and feed-rollers set obliquely to the line of feed carried by said stationary chuck.

78. The combination, with a hollow spindle, of a chuck carried at one end of said spindle; means for actuating said chuck; a second chuck also carried by the hollow spindle; rollers having grooved ribbed peripheries carried by said second chuck; a stationary chuck; and ribbed feed-rollers, set obliquely to the line of feed, carried by said stationary chuck.

79. The combination, with a tubular slotted spindle, of a bushing located in an end of said spindle; a chuck having a hub fitted over said spindle; and a device for securing said hub to the spindle.

80. The combination, with an obliquely-disposed feed device, of a device having means for engaging an article; and means for rotating one of said devices with relation to the other, whereby a feed movement is imparted to said article.

81. The combination, with framework, of a hollow spindle having a head at one end; a chuck mounted in said head; a tubular spindle carrying means for closing said chuck; levers carried by the chuck-spindle; a cone-sleeve for actuating said levers; a yoke in engagement with said cone-sleeve; a lever for actuating the yoke; a stationary chuck; obliquely-disposed feed-rollers movably mounted in said stationary chuck; devices controlled by the lever for opening said feed-rollers when the chuck in the head of the spindle is closed, and for closing said feed-rollers when the chuck is open; and means for rotating an object to be fed against said feed-rollers.

82. The combination, with a pair of chucks, one of which is rotatable with relation to the other, of obliquely-disposed feed mechanism carried by one chuck; means for engaging an article carried by the other chuck; a stock-grasping chuck; and means for actuating said stock-grasping chuck.

83. The combination, with a pair of supports, of an obliquely-disposed feed device movably mounted in one of said supports; means for engaging an article carried by the other support, one of said supports being revoluble with relation to the other; and means for clamping stock advanced by the feed device.

84. The combination, with a pair of facing chucks, one of which is revoluble with relation to the other, of obliquely-disposed rollers carried by one of said chucks; rollers carried by the other of said chucks; a hollow spindle on which one of said chucks is mounted; and means carried by said spindle for clamping stock advanced therethrough by the feed-rollers.

85. The combination, with obliquely-disposed feed mechanism, of stock-carrying mechanism; and supports for each of said mechanisms, one of said supports being revoluble with relation to the other.

86. The combination, with a chuck having an overhanging circular lip or projection, of a second chuck having an inclined circumferential lip fitted within the projection of the other chuck, one of said chucks being revoluble with relation to the other; obliquely-disposed feed mechanism carried by one of the chucks; devices carried by the other chuck for engaging the article advanced by the feed mechanism; a tubular spindle; and a stock-chuck carried by said spindle for clamping stock advanced by the feed mechanism.

87. The combination, with a tubular spindle, of a chuck secured to said spindle; means for engaging stock carried by said chuck; means for rotating the spindle; a face-plate for the chuck having a circumferential inclined lip or projection; a stationary chuck; obliquely-disposed feed mechanism carried by said stationary chuck; and a face-plate for said stationary chuck, said face-plate being provided with an inclined circumferential lip fitting over said overhanging lip.

In testimony whereof I affix my signature in presence of two witnesses.

BENGT M. W. HANSON.

Witnesses:
A. E. THAYER,
J. W. CHAPMAN.